(12) United States Patent
Bogin et al.

(10) Patent No.: US 7,346,716 B2
(45) Date of Patent: Mar. 18, 2008

(54) TRACKING PROGRESS OF DATA STREAMER

(75) Inventors: Zohar Bogin, Folsom, CA (US); Brent D. Chartrand, Cameron Park, CA (US); Arthur D. Hunter, Jr., Cameron Park, CA (US)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 10/723,347

(22) Filed: Nov. 25, 2003

(65) Prior Publication Data

US 2005/0114569 A1    May 26, 2005

(51) Int. Cl.
G06F 3/00     (2006.01)
G06F 13/00    (2006.01)

(52) U.S. Cl. ............................ 710/52; 710/33
(58) Field of Classification Search ............... 710/29, 710/33, 34, 52, 57
See application file for complete search history.

(56) References Cited

U.S. PATENT DOCUMENTS

| | | | |
|---|---|---|---|
| 5,452,432 A | | 9/1995 | Macachor |
| 5,526,353 A | * | 6/1996 | Henley et al. ............ 370/392 |
| 5,530,941 A | | 6/1996 | Weisser et al. |
| 5,664,197 A | | 9/1997 | Kardach et al. |
| 5,678,009 A | | 10/1997 | Bains et al. |
| 5,708,849 A | | 1/1998 | Coke et al. |
| 5,729,762 A | | 3/1998 | Kardach et al. |
| 5,751,994 A | | 5/1998 | Weisser et al. |
| 5,794,070 A | | 8/1998 | Rabe et al. |
| 5,805,842 A | | 9/1998 | Nagaraj et al. |
| 5,822,553 A | * | 10/1998 | Gifford et al. ............ 710/305 |
| 5,862,387 A | | 1/1999 | Songer et al. |
| 5,889,480 A | * | 3/1999 | Kim ........................... 341/50 |
| 5,996,038 A | | 11/1999 | Looi et al. |
| 6,108,743 A | | 8/2000 | Debs et al. |
| 6,119,189 A | | 9/2000 | Gafken et al. |
| 6,131,127 A | | 10/2000 | Gafken et al. |
| 6,151,654 A | | 11/2000 | Poisner et al. |
| 6,157,970 A | | 12/2000 | Gafken et al. |
| 6,275,242 B1 | | 8/2001 | Shah et al. |
| 6,385,671 B1 | | 5/2002 | Hunsaker et al. |
| 6,401,144 B1 | | 6/2002 | Jones |
| 6,418,489 B1 | * | 7/2002 | Mason et al. ............ 710/22 |
| 6,438,686 B1 | | 8/2002 | Daughtry et al. |
| 6,560,657 B1 | | 5/2003 | Gandhi et al. |

(Continued)

OTHER PUBLICATIONS

Brent Chartrand, "Enabling 3rd Generation PC Audio", PowerPoint Presentation, Apr. 9-11, 2003, Intel Corporation.

(Continued)

*Primary Examiner*—Alford Kindred
*Assistant Examiner*—David Martinez
(74) *Attorney, Agent, or Firm*—Philip A. Pedigo

(57) ABSTRACT

Machine-readable media, methods, and apparatus are described to stream data between a codec and a buffer in system memory and to maintain a value in system memory that is indicative of a current position in the buffer. In some embodiments, an audio controller streams the data across an isochronous channel having relaxed ordering rules to the buffer in the system memory and updates the value indicative of current position via a write across the isochronous channel to the system memory.

12 Claims, 3 Drawing Sheets

U.S. PATENT DOCUMENTS

| | | | |
|---|---|---|---|
| 6,567,953 B1 | 5/2003 | Pomerantz | |
| 6,690,676 B1 * | 2/2004 | Gulick | 370/458 |
| 6,693,753 B2 * | 2/2004 | Su et al. | 360/51 |
| 6,792,481 B2 * | 9/2004 | Hoang et al. | 710/25 |
| 7,051,123 B1 * | 5/2006 | Baker et al. | 710/22 |

OTHER PUBLICATIONS

Abdul Jarrar: "Enabling 3rd Generation PC Audio" 'online! Feb. 20, 2003, XP002328049 Retrieved from the Internet: URL:http://cnscenter.future.co.kr/resource/rsc-center/presentation/intel/spring2003/SO3USDSIS134_OS.pdf< 'retrieved on May 12, 2005! the whole document.

Digital Equipment Corporation: "Digital Semiconductor 21140A PCI Fast Ethernet LAN Controller Hardware Reference Manual" DEC Hardware Reference Manual, Jan. 1996, XP002328050 Maynard, Massachusetts pp. 1-1-pp. 1-5; figure 1 pp. 4-1-pp. 4-38.

Trudy Culbreth Brassell: "Universal Audio Architecture" 'Online! 2003, XP002328051 Retrieved from the Internet: URL:http://download.microsoft.com/download/c/f/1/cf1806ad-5a4f-4f7d-a5b2-07fdb59a7adb/WHO3_TPA58.exe> 'retrieved on Apr. 27, 2005! the whole document.

International Application No. PCT/US2004/037459, Int'l. Preliminary Search Report.

* cited by examiner

TRACKING PROGRESS OF DATA STREAMER

BACKGROUND

PCI Express is an I/O (Input/Output) interconnect that attempts to be software compatible with PCI (Peripheral Component Interconnect). While trying to maintain some level of compatibility with PCI, PCI Express offers many features not found or fully supported by PCI. One such feature is the support of isochronous data transfers. Isochronous data transfer support may help multimedia applications such as, for example, audio and/or video playback applications achieve high quality results. However, the PCI Express implementation of isochronous data transfers has relaxed some of the stringent PCI ordering rules. As a result, a software application that isochronously transfers data via a PCI Express channel may need to utilize different techniques to track the progress of such a transfer than techniques used to track the progress of conventional PCI data transfers.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes data streaming techniques. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
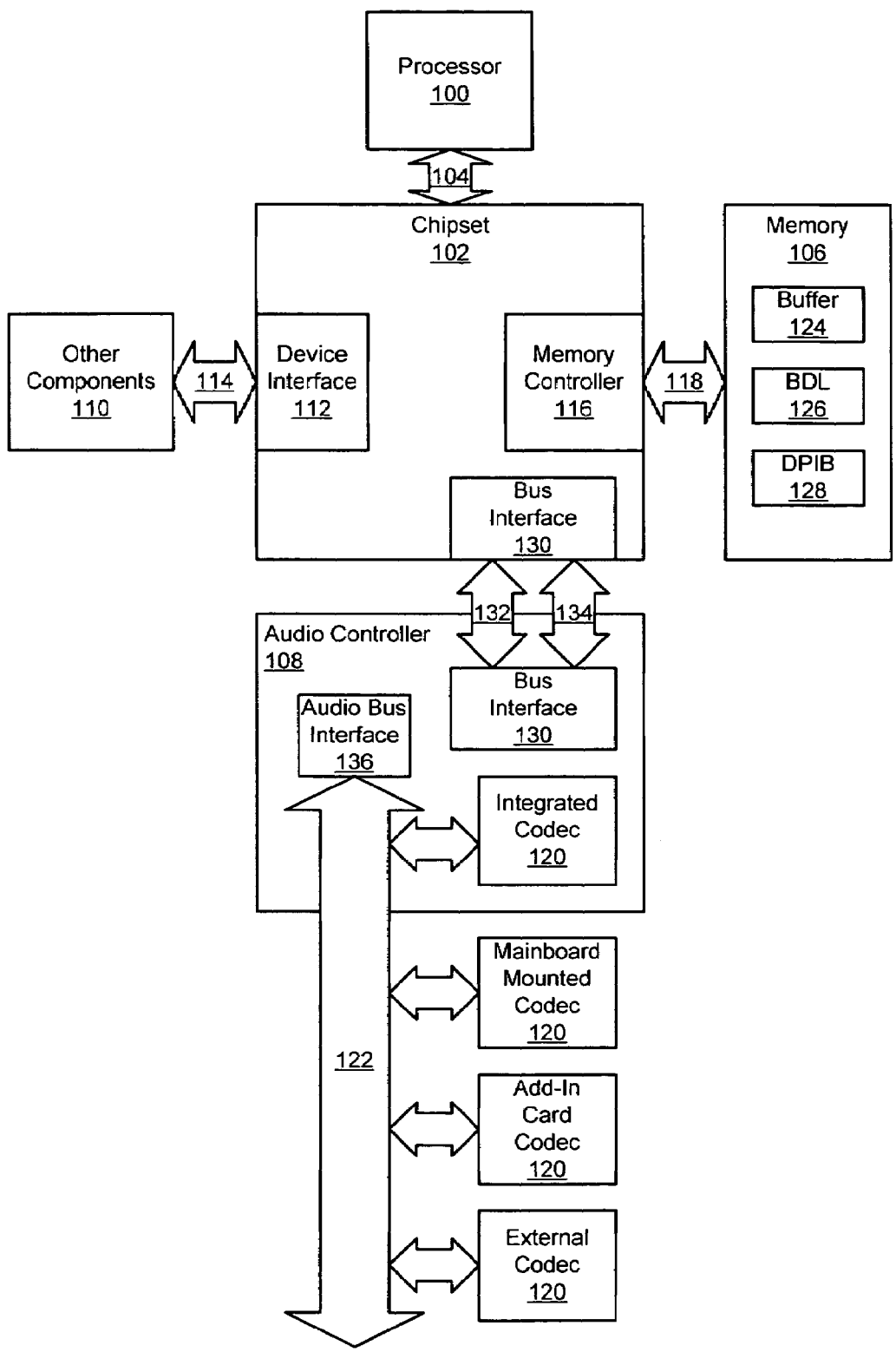
FIG. 1 illustrates an embodiment of a computing device with an audio controller.

An embodiment of a computing device is shown in FIG. 1. The computing device may comprise one or more processors 100 coupled to a chipset 102 via a processor bus 104. The chipset 102 may include one or more integrated circuit packages or chips that couple the processor 100 to a main or system memory 106, an audio controller 108, and/or other components 110 of the computing device. In particular, the chipset 102 may comprise one or more device interfaces 112 to support data transfers to and/or from other components 110 of the computing device such as, for example, BIOS firmware, keyboards, mice, storage devices, network interfaces, etc. via one or more buses 114.

The chipset 102 may further comprise a memory controller 116 to access system memory 106 via a memory bus 118. The memory controller 116 may access the system memory 106 in response to memory transactions associated with the processor 100, the audio controller 108, and other components 110 of the computing device. Further, the system memory 106 may comprise various memory devices that provide addressable storage locations which the memory controller 116 may read data from and/or write data to. In particular, the system memory 106 may comprise one or more different types of memory devices such as, for example, DRAM (Dynamic Random Access Memory) devices, SDRAM (Synchronous DRAM) devices, DDR (Double Data Rate) SDRAM devices, or other memory devices.

The computing device may further comprise one or more codecs 120 coupled to the audio controller 108 via an audio bus 122. The codecs 120 may be integrated into the audio controller 108 and/or chipset 102, may be mounted to a mainboard of the computing device, may be mounted to an add-in card that is coupled to the computing device, and/or may be part of an external device such as, for example, a docking station, audio mixer, etc that is coupled to an interface port (not shown) of the computing device. Further, the codecs 120 may be associated with sound cards, modems, facsimile devices, telephony devices, audio capture devices, video capture devices, etc. of the computing device that generate and/or process streams of data.

The audio controller 108 may stream data between the codecs 120 and buffers 124 of the system memory 106 defined by one or more buffer descriptor lists (BDL) 126 stored in the system memory 106. The audio controller 108 may also update a direct memory access (DMA) position in buffer (DPIB) structure 128 of the system memory 106 to reflect the progress of the audio controller 108 in transferring data between the audio controller 108 and the one or more buffers 124.

The audio controller 108 may be integrated into the chipset 102. However, in the depicted embodiment, the audio controller 108 is separate from the chipset 102. In such an embodiment, the chipset 102 and the audio controller 108 may each comprise one or more bus interfaces 130 that support isochronous data transfers across isochronous channels 132 and/or non-isochronous data transfers across non-isochronous channels 134. In one embodiment, one or more isochronous channels 132 couple a bus interface 130 of the audio controller 108 to a bus interface 130 of the chipset 102 to support isochronous data transfers therebetween. In one embodiment, each bus interface 130 may implement a PCI Express compatible interface that supports isochronous virtual channels. However, the bus interface 130 may implement additional and/or alternative interface protocols. Further, the chipset 102 and bus interface 130 may implement ordering rules similar to PCI Express ordering rules that are more lax than conventional PCI ordering rules. In particular, unlike PCI ordering rules, completion data for processor reads might not push isochronous reads and/or writes to system memory 106. Further, interrupts might not push isochronous reads and/or writes to system memory 106. However, in one embodiment, the ordering rules ensure that isochronous writes do not pass previously issued isochronous reads and/or writes across the same channel.

The audio controller 108 may further comprise an audio bus interface 136 for an audio bus 122 used to couple the codecs 120 to the audio controller 108. In one embodiment, the audio bus interface 136 may receive frames of data from the codecs 120 via one or more point-to-point serial input links of the audio bus 122. The audio bus interface 136 may further send frames of data to one or more of the codecs 120 via a broadcast serial output link of the audio bus 122 that encode and/or decode streams in accordance to various formats.

Figure 2:
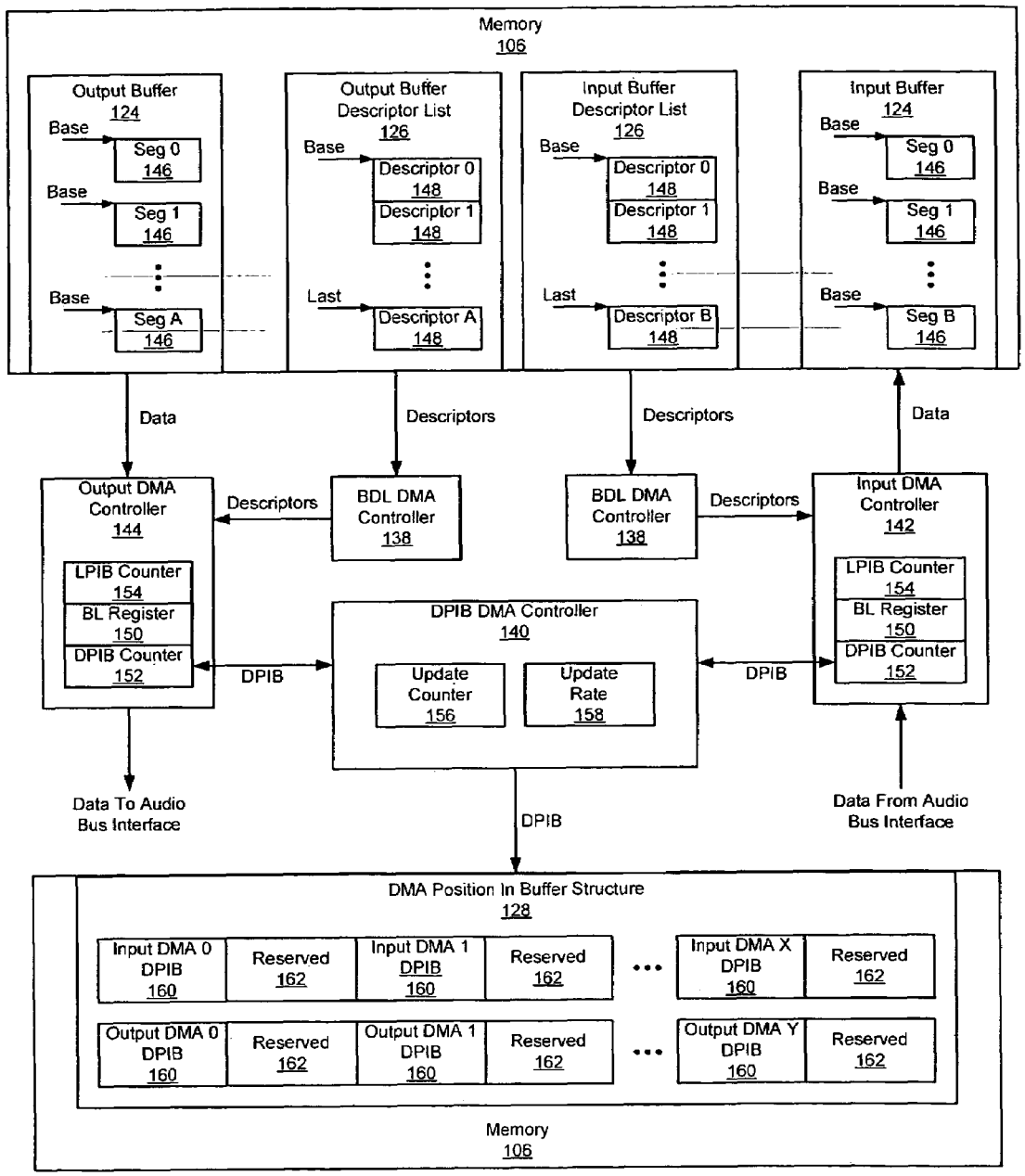
FIG. 2 illustrates an embodiment of an audio controller in relation to buffers and buffer descriptor lists of a system memory. 1.

Referring now to FIG. 2, the audio controller 108 may comprise one or more BDL DMA controllers 138, a DPIB DMA controller 140, one or more input DMA controllers 142, and one or more output DMA controllers 144. In one embodiment, the each input DMA controller 142 may be programmed by the processor 100 to separately stream data received from one or more codecs 120 to a buffer 124 of the system memory 106. Similarly, each output DMA controller 142 may be programmed by the processor 100 to separately stream data from a buffer 124 of the system memory 106 to one or more codecs 120.

Each BDL DMA controller 138 may read a buffer descriptor list 126 from the system memory 106 and provide the buffer descriptor list to the appropriate DMA controller 142, 144. Each buffer descriptor list 126 may define a plurality of buffer segments 146 of a buffer 124 from which a corresponding output DMA controller 142, 144 may read data or from which a corresponding input DMA controller may write data. Each descriptor 148 of a buffer descriptor list 126 may comprise a base that identifies the start of a buffer segment 146 of the buffer 124 and a length that identifies the end of a buffer segment 146. In one embodiment, the DMA controllers 142, 144 may treat their respective buffers 124 as ring buffers or cyclic buffers. Accordingly, upon reaching the end of their respective buffers 124, the DMA controllers 142, 144 may wrap-around or return to the beginning of their corresponding buffer 124.

The audio controller 108 may further comprise a separate buffer length register 150, a separate DMA position in buffer (DPIB) counter 152, and a separate link position in buffer (LPIB) counter 154 for each input DMA controller 142 and output DMA controller 144. The processor 100 and/or the BDL DMA controllers 138 may store in the buffer length register 150 of each DMA controller 142, 144 the length of its corresponding buffer 124. Each input DMA controller 142 may increment its DPIB counter 152 such that the DPIB counter 152 contains a count equal to the number of bytes the input DMA controller 142 has transferred toward its buffer 124. Further, each input DMA controller 142 may increment its LPIB counter 154 such that its LPIB counter 154 contains a count equal to the number of bytes the input DMA controller 142 has received from its input link. Similarly, each output DMA controller 144 may increment its DPIB counter 152 such that the DPIB counter 152 contains a count equal to the number of bytes the output DMA controller 144 has transferred from its buffer 124. Further, each output DMA controller 144 may increment its LPIB counter 154 such that its LPIB counter 154 contains a count equal to the number of bytes the output DMA controller 144 has transferred toward its output link of the audio bus 122.

The DPIB counters 152 and LPIB counters 154 may clear themselves or may be otherwise reset to an initial value (e.g. zero, its corresponding buffer length, etc.) upon their count indicating that the end of the respective buffer 124 has been reached. In one embodiment, the DPIB counters 152 and LPIB counters 154 may clear themselves or may be otherwise reset to an initial value upon their count having a predetermined relationship to the buffer length of the corresponding buffer length register 150. In another embodiment, the DPIB counters 152 and LPIB counters 154 may clear themselves or may be otherwise reset to an initial value in response to the counters 152, 154 overflowing and/or underflowing. Further, the LPIB counters 154 may be implemented such that the processor 100 may read the count of the LPIB counters 154 but may not write to or update the count of LPIB counters 154.

The audio controller 108 may further comprise an update counter 156 and an update rate register 158. In one embodiment, the update counter 156 may generate an overflow signal in response to the count of the update counter 156 incrementing past a value stored in the update rate register 158. In response to the overflow, the count of the update counter 156 may be cleared or set to zero. In another embodiment, the update counter 156 may generate an underflow signal in response to the count of the update counter 156 decrementing past zero. In response to underflowing, the count of the update counter 156 may be set to the value stored in the update rate register 158.

The DPIB DMA controller 140 may use the underflow/ overflow signals to determine when to update a DPIB structure 128. As depicted in FIG. 2, the DPIB structure 128 may comprise a DPIB field 160 for each input DMA controller 142 and each output DMA controller 144. The DPIB structure 128 may further comprise reserved fields 162 that are reserved for possible future use. In one embodiment, the DPIB structure 128 comprises a contiguous portion of system memory 106 and each field 160, 162 of the DPIB structure comprises 32 bits.

Figure 3:
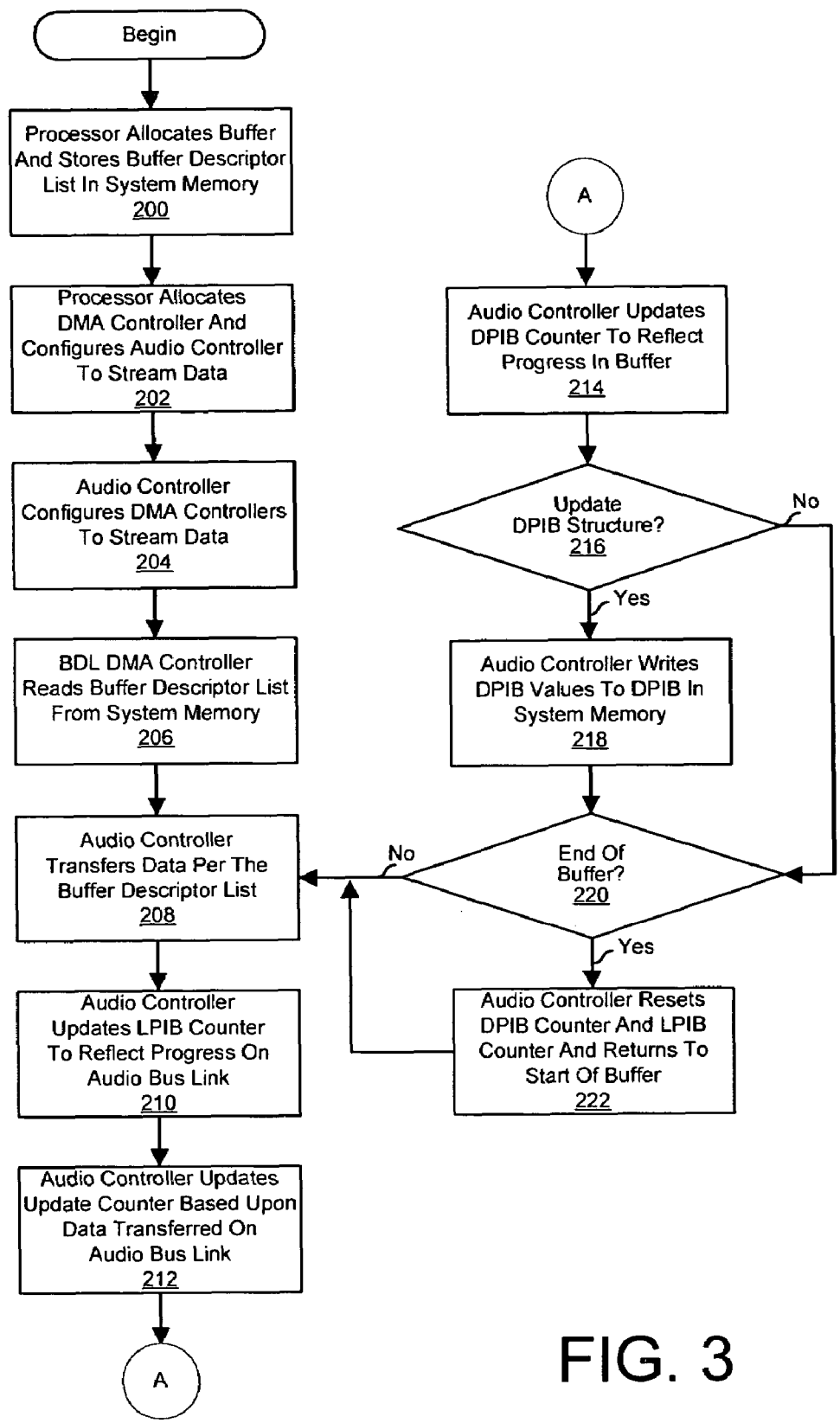
FIG. 3 illustrates an embodiment of a method of transferring data between a buffer in system memory and a codec.

An embodiment of a method to stream or transfer data between a buffer 124 and a codec 120 is shown in FIG. 3. In box 200, the processor 100 may allocate a buffer 124 to a stream and may store a buffer descriptor list 126 in the system memory 106 that identifies the buffer segments 146 of the allocated buffer 124. The processor 100 in box 202 may allocate a DMA controller 142, 144 of the audio controller 108 to the stream and may configure the audio controller 108 to stream the data. In one embodiment, the processor 100 may provide the audio controller 108 with the length of the allocated buffer 124, the base address of the buffer descriptor list 126, a stream identifier of the stream to be transferred, a DMA identifier for the DMA controller 142, 144 to stream the data, one or more codec identifiers for the codecs 120 involved in the data transfer, and an update value for the update rate register 158.

In box 204, the audio controller 108 may configure one or more DMA controllers 138, 140, 142, 144 for the stream based upon the information received from the processor 100. In one embodiment, the audio controller 108 may update the buffer length register 150 for the allocated DMA controller 142, 144 based upon the received buffer length, may initialize the DPIB counter and the LPIB counter 154 for the allocated DMA controller 142, 144, and may provide the BDL DMA controller 138 for the allocated DMA controller 142, 144 with the base address of the buffer descriptor list 126 for the allocated buffer 124 and the DMA identifier for the allocated DMA controller 142, 144.

The BDL DMA controller 138 in box 206 may read the buffer descriptor list 126 from the system memory 106. The BDL DMA controller 138 may further provide the buffer descriptor list 126 to the DMA controller 142, 144 associated with the received DMA identifier and/or may configure the DMA controller 142, 144 to transfer data per the read buffer descriptor list 126. The audio controller 108 in box 208 may then transfer data between the buffer 124 and a codec 120 per the buffer descriptor list 126. In particular for an input stream, the audio bus interface 136 may receive from a codec 120 the stream identifier and associated data via an input link of the audio bus 122. The audio bus interface 136 may route the data to the appropriate input DMA controller 142 based upon the stream identifier and the input DMA controller 142 may write the data to the allocated buffer 124 across an isochronous channel 132. Similarly, an output DMA controller 144 may read data across an isochronous channel 132 from the allocated buffer 124 as defined by the buffer descriptor list 126. The audio bus interface 136 may receive the data from the output DMA controller 144 and may transfer the data in frames to the appropriate codecs 120 via an output link of the audio bus 122.

In response to sending or receiving data via the audio bus interface 136, the DMA controller 142, 144 in box 210 may update its respective LPIB counter 154 to reflect the progress of the transfer on the link of the audio bus 122. In one embodiment, the DMA controller 142, 144 may increment its LPIB counter 154 by the number of bytes transferred on the link since the last update. Further, the DMA controller 142, 144 may update in box 212 the update counter 156 based upon data transferred on its link. In one embodiment, each DMA controller 142, 144 may update the count of the update counter 156 by the number of frames transferred on its respective link since its last update thus causing the update counter 156 to track the number of frames transferred on the audio bus 122.

In response to reading from or writing data to the buffer 124, the DMA controller 142, 144 in box 214 may update its respective DPIB counter 152 to reflect the progress that the DMA controller 142, 144 has made in transferring data between its buffer 124 and the audio controller 108. In one embodiment, the DMA controller 142, 144 may update its DPIB counter 152 by the number of bytes transferred between its buffer 124 and the audio controller 108 since the last update.

In box 216, the DPIB DMA controller 140 may determine whether to update the DPIB structure 128 in the system memory 106 based upon the count of the update counter 156. In one embodiment, the DPIB DMA controller 140 may determine to update the DPIB structure 128 stored in the system memory 106 in response to an overflow and/or underflow signal of the update counter 156. In another embodiment, the DPIB DMA controller 140 may determine to update the DPIB structure 128 in response to determining that the count of the update counter 156 has a predetermined relationship (e.g. equal) to an update value stored in the update rate register 158. In response to determining to update the DPIB structure 128, the DPIB DMA controller 140 in box 218 may write the current values of the DPIB counters 152 across the same virtual channel used by the DMA controllers 142, 144 to their respective DPIB fields 160 of the DPIB structure 128 in the system memory 106.

As a result of the bus interfaces 130 maintaining write ordering across the virtual channel, the processor 100 may determine from the DPIB structure 128 the progress of the audio controller 108 in isochronously transferring data to and/or from a buffer 124 in the system memory 106. Further, the processor 100 may read the LPIB counter 154 to determine the progress of the audio controller 108 in transferring data across a link of the audio bus 122.

In box 220, the audio controller 108 may determine whether the DMA controller 142, 144 has reached the end of its buffer 124. In one embodiment, the audio controller 108 may determine that the DMA controller 142, 144 has reached the end of its buffer 124 in response to an overflow and/or underflow signal of the DPIB counter 156. In another embodiment, the audio controller 108 may determine that the DMA controller 142, 144 has reached the end of its buffer 124 in response to determining that the count of the DPIB counter 152 has a predetermined relationship (e.g. equal) to a buffer length stored in its corresponding buffer length register 150. In response to determining that the end of the buffer 124 has been reached, the DMA controller 142, 144 in box 222 may reset or initialize its DPIB counter 152 and LPIB counter 154. The DMA controller 142, 144 may further return to the start of its buffer 124 per its buffer descriptor list 126. The DMA controller 142, 144 may then return to box 208 to continue transferring data between its buffer 124 and the audio controller 108.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. In a controller of a computing device, the computing device comprising a system memory and a codec, a method being implemented by the controller comprising:
   receiving a buffer descriptor list from a buffer descriptor list controller, the buffer descriptor list defining a plurality of buffer segments of a buffer to be read,
   reading data from the buffer of the system memory via a first interface of the controller based, at least in part, on the buffer descriptor list,
   transferring the data to the codec via a second interface of the controller,
   tracking a position in the buffer from which the controller has read the data, and
   writing a value to a direct memory access position-in-buffer (DPIB) structure located in the system memory via the first interface to indicate the position in the buffer, wherein the first interface is an isochronous interface that supports relaxed ordering rules.

2. The method of claim 1 wherein the reading comprises isochronously receiving the data via the first interface.

3. The method of claim 1 further comprising tracking progress of transferring the data to the codec via the second interface.

4. The method of claim 1 wherein reading the data from the buffer comprises reading the data per a buffer descriptor list that defines the buffer.

5. The method of claim 4, wherein reading the data from the buffer further comprises returning to a start of the buffer in response to reaching an end of the buffer.

6. The method of claim 1 further comprises, prior to writing the value to system memory, determining whether to update the value in the system memory based upon the data transferred via the second interface.

7. A controller comprising
a buffer descriptor list controller to provide a buffer descriptor list to a first direct memory access controller,
the first direct memory access controller to transfer data between a system memory and a codec via a first interface to the system memory and a second interface to the codec based, at least in part, on the buffer descriptor list, and
a position controller to update a position value in a direct memory access position-in-buffer (DPIB) structure located in the system memory via the first interface to indicate progress of the first direct memory access controller in transferring data between the system memory and the codec, wherein the first interface is an isochronous interface that supports relaxed ordering rules.

8. The controller of claim 7 further comprising a second direct memory access controller
to read from the system memory a buffer descriptor list that defines a buffer in the system memory, and
to configure the first direct memory access controller to transfer the data between the buffer and the codec per the buffer descriptor list.

9. The controller of claim 7 further comprising a link counter to maintain a count indicating progress of the first direct memory access controller in transferring the data across the second interface.

10. The controller of claim 7 further comprising a buffer position counter to maintain a count indicating progress of the first direct memory access controller in transferring the data across the first interface.

11. The controller of claim 7 wherein the first direct memory access controller isochronously writes the data to the buffer.

12. The controller of claim 7 wherein the first direct memory access controller isochronously reads the data from the buffer.

* * * * *